United States Patent [19]
Gottwald

[11] Patent Number: 5,526,159
[45] Date of Patent: Jun. 11, 1996

[54] METHOD AND CIRCUIT ARRANGEMENT FOR ELECTRIC COMPENSATION OF SIGNAL DISTORTION CAUSED BY LASER CHIRP AND FIBER DISPERSION

[75] Inventor: Erich Gottwald, Holzkirchen, Germany

[73] Assignee: Siemens Aktiengesellschaft, Munich, Germany

[21] Appl. No.: 379,633

[22] PCT Filed: Aug. 5, 1993

[86] PCT No.: PCT/EP93/02092

§ 371 Date: Apr. 28, 1995

§ 102(e) Date: Apr. 28, 1995

[87] PCT Pub. No.: WO94/03987

PCT Pub. Date: Feb. 17, 1994

[30] Foreign Application Priority Data

Aug. 6, 1992 [DE] Germany .......................... 92113449.0

[51] Int. Cl.⁶ .................................................. H04B 10/00
[52] U.S. Cl. .......................... 359/161; 359/187; 375/296
[58] Field of Search .................................. 359/111, 153, 359/161, 180, 187, 194; 455/63; 375/285, 296; 330/149

[56] References Cited

U.S. PATENT DOCUMENTS

| | | | |
|---|---|---|---|
| 5,418,637 | 5/1995 | Cuo | 359/161 |
| 5,430,969 | 7/1995 | Blauvelt et al. | 319/194 |

FOREIGN PATENT DOCUMENTS

| | | | |
|---|---|---|---|
| 0475376 | 3/1992 | European Pat. Off. | 359/161 |
| 0524758 | 1/1993 | European Pat. Off. | 359/161 |

OTHER PUBLICATIONS

Gysel, "Electrical Predistortion to Compensate for Combined Effect Chirp of Laser and Fibre Dispersion", Electronics Letters, vol. 27, No. 5, Feb. 28, 1991, pp. 421–423.
Wedding, "Reduction of Bit Error Rate in High Speed Optical Transmission Systems Due to Optimized Electrical Drive Pulse Shaping", 14th European Conference On Optical Communications, Sep. 1988, pp. 187–190.
Petermann et al, "Chirp Reduction in Intensity–Modulated Semiconductor Lasers for Maximum Transmission Capacity of Single–Mode Fibres", Archiv Für Elektronik und Übertraagungstechnik, Sep. 1986, pp. 283–288.
Walker et al, "Wide Bandwidth, Long Distance Fibre–Optic Communication Systems", Agard Conference Proceedings No. 383, Guided Optical Structures In The Military Enviroment, Sep. 1985, pp. 27.1–27.9.

*Primary Examiner*—Leo Boudreau
*Assistant Examiner*—Kinfe-Michael Negash
*Attorney, Agent, or Firm*—Hill, Steadman & Simpson

[57] ABSTRACT

For the purpose of electric compensation of signal distortion in an optical telecommunication system caused by laser chirp and fiber dispersion, a correction signal is derived from the electric transmission and/or reception signal by squaring followed by differentiation and added to the electric transmission signal and/or reception signal, respectively, after necessary attenuation.

6 Claims, 1 Drawing Sheet

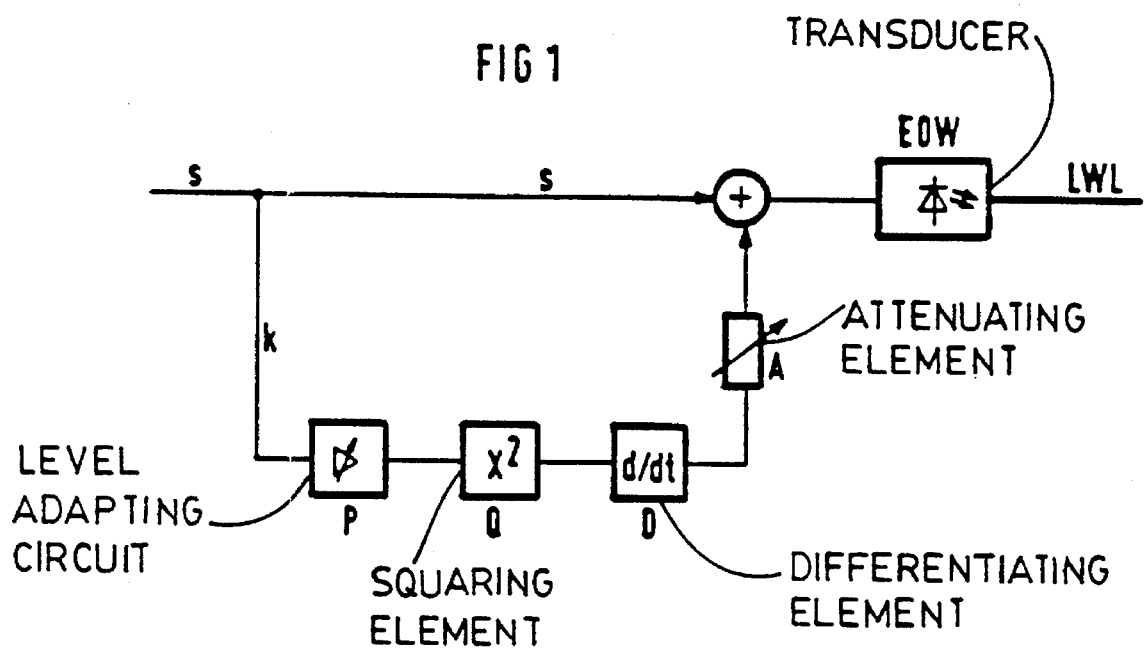
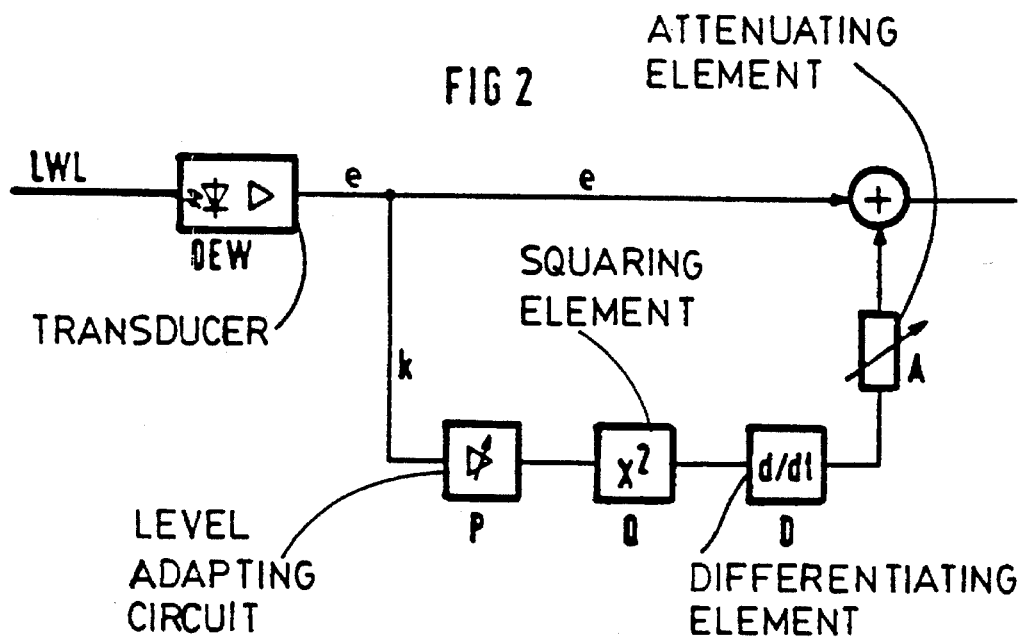

METHOD AND CIRCUIT ARRANGEMENT FOR ELECTRIC COMPENSATION OF SIGNAL DISTORTION CAUSED BY LASER CHIRP AND FIBER DISPERSION

BACKGROUND OF THE INVENTION

In optical telecommunication systems with signal transmission via optical fibers, the interaction of laser chirp, on the one hand, and fiber dispersion, on the other hand, leads to possibly substantial signal distortion which, in particular in the case of analog signal transmission (for example, AM-CATV) in the wavelength window around 1.55 µm via standard monomode fibers, can restrict the range of such systems to a few hundred meters.

Laser chirp, that is to say the modulation-dependent frequency deviation of a laser, can be circumvented by the use of external modulators, but this entails an appreciable outlay. An attempt can be made to combat fiber dispersion, that is to say the wavelength-dependent spread of the signal propagation time in the optical fiber, by splicing in fiber pieces having a dispersion opposite to that of the standard fiber, but it is then necessary to accept an appreciable additional attenuation. A further approach to a solution is offered by electronic compensation measures; thus, an all-pass and a low-pass filter structure (with a varactor diode) for compensating the fiber dispersion by corresponding signal delays are known from ELECTRONICS LETTERS 27 (1991) 5 dated 28.02.1991, pages 421 to 423.

By contrast, the invention adopts a different approach for the purpose of electric compensation of signal distortion in an optical telecommunication system caused by laser chirp and fiber dispersion.

SUMMARY OF THE INVENTION

The invention relates to a method and a circuit arrangement for electric compensation of signal distortion caused by laser chirp and fiber dispersion. The method is characterized in that a correction signal is derived from the electric transmission and/or reception signal by squaring followed by differentiation and is added to the electric transmission signal and/or reception signal, respectively, after a level correction necessary per se in the form of a signal attenuation; the circuit arrangement is characterized according to the invention in that, branching from the electric transmission and/or reception signal path is a correction signal path which has a squaring element and a downstream differentiating element and opens out again into the electric signal path after a downstream level correction circuit via an adding input, it being the case that in a further embodiment of the invention a level adapting circuit can be connected upstream of the squaring element in the correction signal path.

The invention, which proceeds from a relationship between the light output and the optical frequency of the laser which is linear and phase-locked at least to a good approximation, and is based on the finding that a signal occurring at the end of a dispersive transmission link essentially comprises the original signal and an interference term which can be simulated electrically in a very simple way, is attended by the advantage that signal distortion caused by laser chirp and fiber dispersion can be compensated electrically at the receiving end and/or (given a defined length of link) at the transmission end in a very effective way independently of the mean signal level with a very low outlay on circuitry.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a circuit arrangement for electric compensation at the transmission end, and FIG. 2 shows a circuit arrangement for electric compensation at the reception end of signal distortion induced by laser chirp and fiber dispersion.

DESCRIPTION OF THE PREFERRED EMBODIMENTS

Represented diagrammatically in FIG. 1 to an extent required in order to understand the invention is an exemplary embodiment of a circuit arrangement for electric compensation of signal distortions in an optical telecommunication system caused by laser chirp and fiber dispersion, in which an electric transmission signal path s leads to an optical fiber LWL via an electro-optic transducer EOW formed by a laser diode. Branching off from the electric transmission signal path s is a correction signal path k which has a squaring element Q and a downstream differentiating element D and which opens out again into the electric signal path s after a downstream signal attenuating element A via an adding input; as may be seen from FIG. 1, a level adapting circuit P can be connected upstream of the squaring element Q in the correction signal path k depending on the type of the squaring element.

Owing to the fact that a correction signal is derived from the electric transmission signal by squaring followed by differentiation and added to the electric transmission signal after a necessary attenuation, signal distortion caused in the optical telecommunication system containing the optical fiber LWL by the interaction of laser chirp and fiber dispersion is electrically compensated:

The starting point is assumed to be a relationship between the light output of the laser EOW and the optical frequency thereof, which is at least approximately linear and phase-locked and can be described by means of $$\Delta f = \frac{\delta}{\alpha} P(t) \qquad (1)$$

$\Delta f$ is the frequency deviation of the laser from the mean value given at the mean light output $P_0$, $\alpha$ is the ratio of the change in output to the change in current of the laser, $\delta$ is the ratio of the change in frequency to the change in current of the laser, and $P(t)$ is the change in output of the laser caused by modulation.

Owing to this (linear) relationship between light output and optical frequency, in the case of a dispersive optical fiber LWL the—frequency-dependent—signal propagation time on the optical fiber depends on the signal amplitude; if the fiber dispersion is denoted by D and the fiber length by L, the signal propagation time deviates from the mean value $\tau_0$ given in the case of the mean light output $P_0$ by $$\Delta \tau = D \cdot L \cdot \Delta f \qquad (2)$$

In the case of a change in optical output $$P(t) = P_0 \cdot m \cdot \sum_{i=1}^{n} \cos(w_i \cdot t), \quad (3)$$

caused by modulation, wherein $w_i/2\pi$ is the carrier frequency of the ith transmission channel, the result at the far end of the optical fiber LWL is thus a light output of $$P^*(t-\tau_0) \sim P_0 \cdot m \cdot \sum_{i=1}^{n} \cos(w_i(t-\Delta\tau)) = \quad (4)$$

$$P_0 \cdot m \cdot \sum_{i=1}^{n} \cos\left((w_i \cdot t) - \left(w_i \cdot D \cdot L \cdot \frac{\delta}{\alpha} \cdot P(t)\right)\right),$$

wherein m is the modulation index (identical for all signal channels). In practice, in the case of slight interference, it holds that $w_i \cdot D \cdot L \cdot (\delta/\alpha) \cdot P(t) < 1$; for example, in the case of a standard monomode fiber it can be that $D=1.18\times10^{-25}$ s$^2$/m (at a wavelength of 1.55 μm) and
$L=10,000$ m
and in the case of a laser (Fujitsu FLD 150 F2KP)
$\alpha=0.04$ mW/mA and $\delta=550$ MHz/mA,
from which it follows that $D \cdot L \cdot (\delta/\alpha)=1.77 \cdot 10^{-11}$ s/mW.

Using $\cos(u-v)=\cos u \cdot \cos v + \sin u \cdot \sin v$ (addition theorem) and $\cos v = 1$ for $v \ll 1$,
$\sin v = v$ for $v \ll 1$
and
$d/dt \cos wt = -\sin wt$,
$d/dt \cos^2 wt = -2w \cdot \cos wt \cdot \sin wt$
it is also possible to write $$P^*(t-\tau_0) \sim P_0 \cdot m \cdot \sum_{i=1}^{n} \cos(w_i t - w_i \cdot \Delta\tau) = \quad (6)$$

$$P_0 \cdot m \cdot \sum_{i=1}^{n} \left(\cos w_i t + w_i \cdot D \cdot L \cdot \frac{\delta}{\alpha} \cdot P(t) \cdot \sin w_i t\right) =$$

$$P(t) + w_i \cdot D \cdot L \cdot \frac{\delta}{\alpha} \cdot P(t) \cdot \left(-\frac{d}{dt} P(t)\right) =$$

$$P(t) - \frac{1}{2} w_i \cdot D \cdot L \cdot \frac{\delta}{\alpha} \cdot \frac{d}{dt} P^2(t).$$

instead of equation (4), when substituting equation (3) in equation (4).

The position and intensity of the interference term is obtained as $$D \cdot L \cdot \frac{\delta}{\alpha} \cdot \frac{d}{dt} P^2(t) = \quad (7)$$

$$\frac{1}{2} \cdot D \cdot L \cdot \frac{\delta}{\alpha} \cdot P_0^2 \cdot m^2 \cdot \left\{ \sum_{i=1}^{n} w_i \cdot \sin(2w_i t) + \right.$$

$$\sum_{i=1}^{n-1} \sum_{j=i+1}^{n} (w_i + w_j) \cdot \sin((w_i + w_j)t) +$$

$$\left. (w_j - w_i) \cdot \sin((w_j - w_i)t) \right\}$$

by substituting equation (3) in equation (6). n (n+1)/2 interference lines occur. The signal at the far end of the optical fiber is composed of the original signal and an interference signal orthogonal thereto. This interference signal is proportional not only to the optical fiber length, dispersion and chirp, but also to the frequency at which the interference occurs.

By squaring and subsequent differentiation of the transmission signal P(t), the correction signal is obtained, after attenuation in accordance with the factor $\frac{1}{2}w_i DL(\delta/\alpha)$, for electric compensation of the signal distortions caused by the interaction of laser chirp and fiber dispersion.

Since the signal distortion term is very small per se (approximately 40 to 60 dB below the useful signal level), it is also possible to use the disturbed reception signal to generate the correction signal by using squaring and subsequent differentiation to derive from the electric reception signal a correction signal which is added to the electric reception signal after a level correction which is necessary per se in the form of signal attenuation.

FIG. 2 represents an exemplary embodiment of a circuit arrangement for electric compensation of signal distortion in an optical telecommunication system caused by laser chirp and fiber dispersion, in which an optical fiber LWL leads to an electric reception signal path e via an optoelectric transducer OEW. Branching from the electric reception path e is a correction signal path k which has a squaring element Q and a downstream differentiating element D and which opens out again into the electric signal path e after a downstream signal attenuating element A; a level adapting circuit P can be connected in turn upstream of the squaring element Q in the correction signal path k, depending on the squaring element used.

As follows from the above explanation of the invention, the correction signal formed by squaring followed by differentiation further requires a level adaptation, specifically in principle in the form of a signal attenuation; in the case of poor efficiency of the squaring element and differentiating element and an excessively low correction signal level resulting therefrom, however, a level correction in the form of a correction signal amplification can also become necessary on occasion.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for electric compensation of signal distortion in an optical telecommunication system caused by laser chirp and fiber dispersion, comprising the steps of: deriving a correction signal from an electric transmission signal by squaring followed by differentiation; and adding the correction signal to the electric transmission signal after a level correction in the form of a signal attenuation.

2. A method for electric compensation of signal distortion in an optical telecommunication system caused by laser chirp and fiber dispersion comprising the steps of: deriving a correction signal from an electric reception signal by squaring followed by differentiation; and adding the correction signal to the electric reception signal after a level correction in the form of a signal attenuation.

3. A circuit arrangement for electric compensation of signal distortion in an optical telecommunication system caused by laser chirp and fiber dispersion, comprising: an electric transmission signal path and, branching therefrom, a correction signal path; said correction signal path having a squaring element and a downstream differentiating element; and said correction signal path having an output end connected via an adding input to the electric signal path after a downstream level correction circuit.

4. The circuit arrangement as claimed in claim 3, wherein a level adapting circuit is connected upstream of the squaring element in the correction signal path.

5. A circuit arrangement for electric compensation of signal distortion in an optical telecommunication system caused by laser chirp and fiber dispersion, comprising an electric reception signal path; branching from the electric reception signal path, a correction signal path which has a squaring element and a downstream differentiating element; and said correction signal path having an output end connected to, via an adding input, the electric reception signal path after a downstream level correction circuit.

6. The circuit arrangement as claimed in claim 5, wherein a level adapting circuit is connected upstream of the squaring element in the correction signal path.

* * * * *